United States Patent
Luo et al.

(10) Patent No.: US 11,089,156 B1
(45) Date of Patent: Aug. 10, 2021

(54) TESTING EMERGENCY TEXT SERVICES (71) Applicant: T-Mobile USA, Inc., Bellevue, WA (US)

(72) Inventors: Tong Luo, Issaquah, WA (US); William Michael Hooker, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/918,296

(22) Filed: Jul. 1, 2020

(51) Int. Cl.
H04M 11/04 (2006.01)
H04W 4/021 (2018.01)
H04M 3/51 (2006.01)
H04L 1/16 (2006.01)
H04W 76/50 (2018.01)

(52) U.S. Cl.
CPC ......... H04M 3/5116 (2013.01); H04L 1/1657 (2013.01); H04M 11/04 (2013.01); H04W 4/022 (2013.01); H04W 76/50 (2018.02); H04M 2242/04 (2013.01)

(58) Field of Classification Search
None
See application file for complete search history.

(56) References Cited

U.S. PATENT DOCUMENTS

| | | | | |
|---|---|---|---|---|
| 6,792,080 B1* | 9/2004 | Imperato | ................. | H04M 1/24 379/1.01 |
| 7,133,498 B2* | 11/2006 | Cacioppo | ............. | H04W 4/029 379/45 |
| 7,420,963 B1* | 9/2008 | Shankar | ................. | H04L 12/66 370/352 |
| 8,699,672 B1* | 4/2014 | Schumacher | ....... | H04M 3/5183 379/40 |
| 8,761,718 B2* | 6/2014 | Koepke | ................... | H04W 4/02 455/404.2 |
| 10,791,221 B1* | 9/2020 | Vislocky | ............... | H04M 3/323 |
| 2007/0019769 A1* | 1/2007 | Green | ................... | H04B 17/27 375/360 |
| 2018/0368010 A1* | 12/2018 | Mitchell | ............... | H04W 24/04 |

* cited by examiner

Primary Examiner — Quoc D Tran
(74) Attorney, Agent, or Firm — Lee & Hayes, P.C.

(57) ABSTRACT

Systems and methods for testing a text-to-911 system of a public safety answering point (PSAP) are described herein. The systems and methods provide for an administrative line that the PSAP, whereby a user can test the PSAP and determine if information that would be used by the PSAP in the case of an emergency is correct.

14 Claims, 5 Drawing Sheets

TESTING EMERGENCY TEXT SERVICES

BACKGROUND

In past years, an individual can request emergency services, such as fire and police services, by playing an emergency call using a specially allocated number (e.g. 9-1-1). As network capabilities have progressed, increasingly people are able to request emergency services via text (e.g. text to 9-1-1). The increasing use of cellular networks and the mobility of the devices that use those networks can cause problems, especially with the location of the caller. If the location of the mobile device or serving cell sector is inaccurate or unknown to a required degree of specificity, the ability to connect the texter to the correct PSAP and dispatch first responders to the correct location can be an issue.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure can comprise systems and methods for testing text-to-911 services to public safety answering point (PSAP). As used herein, a PSAP is a dedicated call center that receives emergency calls and texts. The PSAP processes the calls and texts and dispatches emergency services accordingly. In some examples of the presently disclosed subject matter, an administrative line at the PSAP is provided and used as a testing line. A user wanting to test whether or not emergency services are available for use can use an emergency test text number rather than an emergency text number. The emergency test text is routed to the PSAP by a network, either alone or in conjunction with one or more third party services. The PSAP receives the emergency test text at the administrative line. An answer bot automatically "answers" the emergency test text by responding with information that may be helpful to the user testing the system, i.e. an acknowledgement that the test was successfully received at the PSAP, the location of the device transmitting the emergency test text, and the like.

The systems and methods discussed herein are discussed generally with respect to cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

Figure 1:
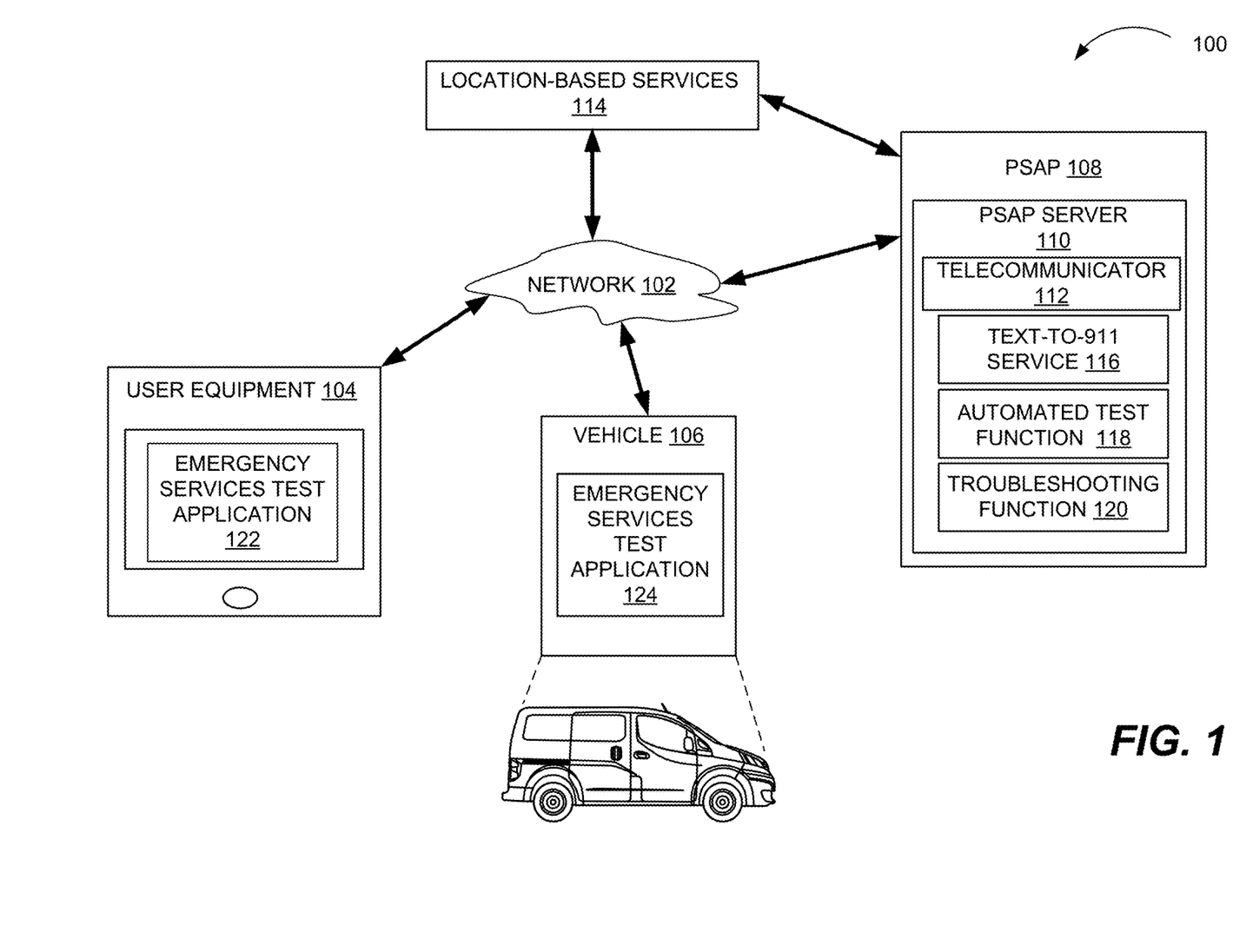
FIG. 1 depicts a system for testing text-to-911 services of a public safety answering point (PSAP), in accordance with some examples of the present disclosure.

As shown in FIG. 1, examples of the present disclosure can comprise a system 100 for testing text-to-911 services to public safety answering point (PSAP), in accordance with some examples of the present disclosure. It should be noted that the use of "9-1-1," or another set of numbers, is merely for purposes of explanation and not to limit the scope of the present disclosure to services that use any specific numbers, as the presently disclosed subject matter may be used with PSAPs having different numbers. Returning to FIG. 1, the system 100 includes a network 102, which may be a cellular network, a Wi-Fi network, or other various types of network in which communications may be received and transmitted between a user equipment 104 or a vehicle 106 and a PSAP 108.

The PSAP 108 is a call center for receiving emergency communications. In conventional voice systems, a user (not shown) may initiate a voice call to the PSAP 108 using an abbreviated number dedicated to emergency services, such as "9-1-1" in the United States. The call is routed by the network 102 to the PSAP 108. It should be noted that other networks or network components, including third party services, may be involved in routing an originating call from the UE 104 to the PSAP 108. Any additional components necessary to route a call from the UE 104 to the PSAP 108 are known to those of ordinary skill in the relevant art. Once the call is received at the PSAP 108, a PSAP server 110 routes the call to an telecommunicator 112. In some examples, the telecommunicator 112 may be called a dispatcher. The telecommunicator 112 receives the call at their station (not shown), determines the services needed, such as police, fire, and medical emergency services, and routes those services to the appropriate location.

In conventional versions of PSAPs, the location of the UE 104 was readily available, as the UE 104 was typically a landline assigned to a particular address or location. When the call was connected, the telecommunicator 112 received the address of the UE 104. However, it is increasingly becoming prevalent where the UE 104 is not a landline assigned to a particular location, but rather, a mobile device (such as a cell phone, table, laptop computer, and the like) that can be moved from location to location. In these examples, some PSAPs 108 use location-based services 114 to provide the location of the UE 104 to the PSAP 108. The location-based services 114 may be part of the network 102 or may be other services that can provide a location of the UE 104 to the PSAP 108.

As noted above, it is not atypical for the UE 104 to be moved from location to location. This can present an issue with the user of the UE 104, as the user may not know if their current location supports access to a PSAP, such as the PSAP 108, or if the location provided to the telecommunicator 112 is correct. Further, the user may not know if text-to-911 services are supported by the PSAP 108. As used herein, "text-to-911" means that a user texts an emergency number rather then places a voice call to the emergency number Thus, in instances such as these, it may be desirable for the user to test the PSAP 108 to determine if the text-to-911 service is supported and if parameters, such as a location, identification, and the like, provided to the telecommunicator 112 are correct.

However, testing emergency services, such as a text-to-911 service 116 provided by the PSAP 108, can use bandwidth that may be needed by other devices in emergency situations. For example, if there was a major incident in a building, hundreds of devices may be trying to access the PSAP 108. If the PSAP 108 is receiving a test message on their emergency line that gets routed to telecommunicators 112, the telecommunicators 112 or other functions of the PSAP 108 may be unable to service actual emergencies because of resources used for responding to tests.

To provide for testing of the text-to-911 service 116 of the PSAP 108, the PSAP 108 includes an automated test function 118. The automated test function 118 is accessed using a number that is routed to the PSAP 108 but is not routed to the telecommunicator 112 by the PSAP server 110. Rather, when the PSAP 108 receives a text from a test number, the PSAP server 110 routes the text to the automated test function 118. When the text is received, the automated test function 118 retrieves certain parameters that may be used when an actual text-to-911 message is received and transmits those parameters as a response to the UE 104. In some examples, a text-to-911 message can be an SMS, MMS, RCS, MSRP, RTT text, or other type of message. The user of the UE 104 can be provided those parameters and determine if the parameters are accurate. In this manner, because the test text is routed to the PSAP 108 rather than an outside entity, when the user receives a response, the user can determine that the text was actually received at the PSAP server 110, thus testing the "last leg" of the communication, i.e. the PSAP server 110 of the PSAP 108.

In addition, the user is presented with parameters that the PSAP 108 may use to provide services to the user of the UE 104. One example of a parameter is the geographical location of the UE 104. Because the UE 104 may be moved from one location to another, and because the amount of information transmitted in a text-to-911 message may be limited, the ability to determine an accurate location of the UE 104 may be vital in providing emergency services. Thus, when the UE 104 receives the parameters, such as a location, a user can review the parameters to determine if the parameters are correct.

To access the test function, the UE 104 is provided an emergency services test application 122. When the emergency services test application 122 is initiated at the UE 104, the emergency services test application 122 transmits a test text to the automated test function 118 of the PSAP 108. In some examples, the automated test function 118 may be accessed by using a special text test number, whereby the responses are provided in an instant message or short message service (SMS) format. In those examples, the automated test function 118 is configured to automatically send a text message to a predetermined test number. In some examples, similar functionality may be obtained by a user texting the test number using an SMS system. However, in some examples, the user may not know the test number. Further, a test number (or application) may also potentially place the UE 104 or other component of the system 100 in emergency mode, which may undesirably activate sensors and location technology typically only used when an actual emergency number or text is transmitted. Further, as the UE 104 is moved from one location to the next, the test number of one PSAP may be different than the test number of another PSAP. Therefore, the emergency services test application 122 may be configured to have an update feature, whereby the emergency services test application 122 queries or receives updates comprising a test number of the PSAP serving the location of the UE 104. In that manner, the user of the UE 104 is not required to know or update their knowledge of the test number for a particular PSAP serving the area in which the UE 104 is located.

In a similar manner, the vehicle 106 may also be provided with an emergency services test application 124. In some examples, the vehicle 106 may be equipped with communication capabilities that provides for the ability of the vehicle 106 to communicate with the network 102 in a manner similar to the UE 104 communicating with the network 102. For example, the vehicle 106 may be equipped with a transceiver and processor that allows the vehicle 106, or a component thereof, to communicate with the network 102 through a cellular or Wi-Fi connection, or another suitable communication means.

In some examples, the vehicle 106, or a component thereof, may be able to transmit a text-to-911 message in addition to, or in lieu of, the user equipment 104, which may also be in the vehicle 106. In these examples, the vehicle 106, or user using the vehicle 106, may desire to test the text-to-911 capabilities of the vehicle 106 at the location of the vehicle 106. In this manner, the vehicle 106 may be equipped with an emergency services test application 124. The emergency services test application 124 may operate in a manner similar to the emergency services test application 122 on the UE 104. Periodically, or as the vehicle 106 moves a certain distance, the emergency services test application 124 may send a test text the PSAP 108 using the text number for the automated test function 118.

The emergency services test application 122 and/or the emergency services test application 124 may automatically, or upon an input by a user, send test texts to the automated test function 118 based on a linear or total distance travelled. The reason for this may be a determination that if the linear or total distance travelled is performed, there is a greater than even likelihood that the user equipment 104 or the vehicle 106 may have left a previously tested area and entered into a new area not tested, not serviced by the PSAP 108, been handed off from one cellular tower to another cellular tower, and the like. These and other conditions may affect the certainty that if a text-to-911 message is transmitted, a PSAP such as the PSAP 108 or another PSAP, will receive the text and be able to provide services. Distances, such as linear or total distances, may be determined using various location services, such as, but not limited to, the Global Positioning System (GPS).

Figure 2:
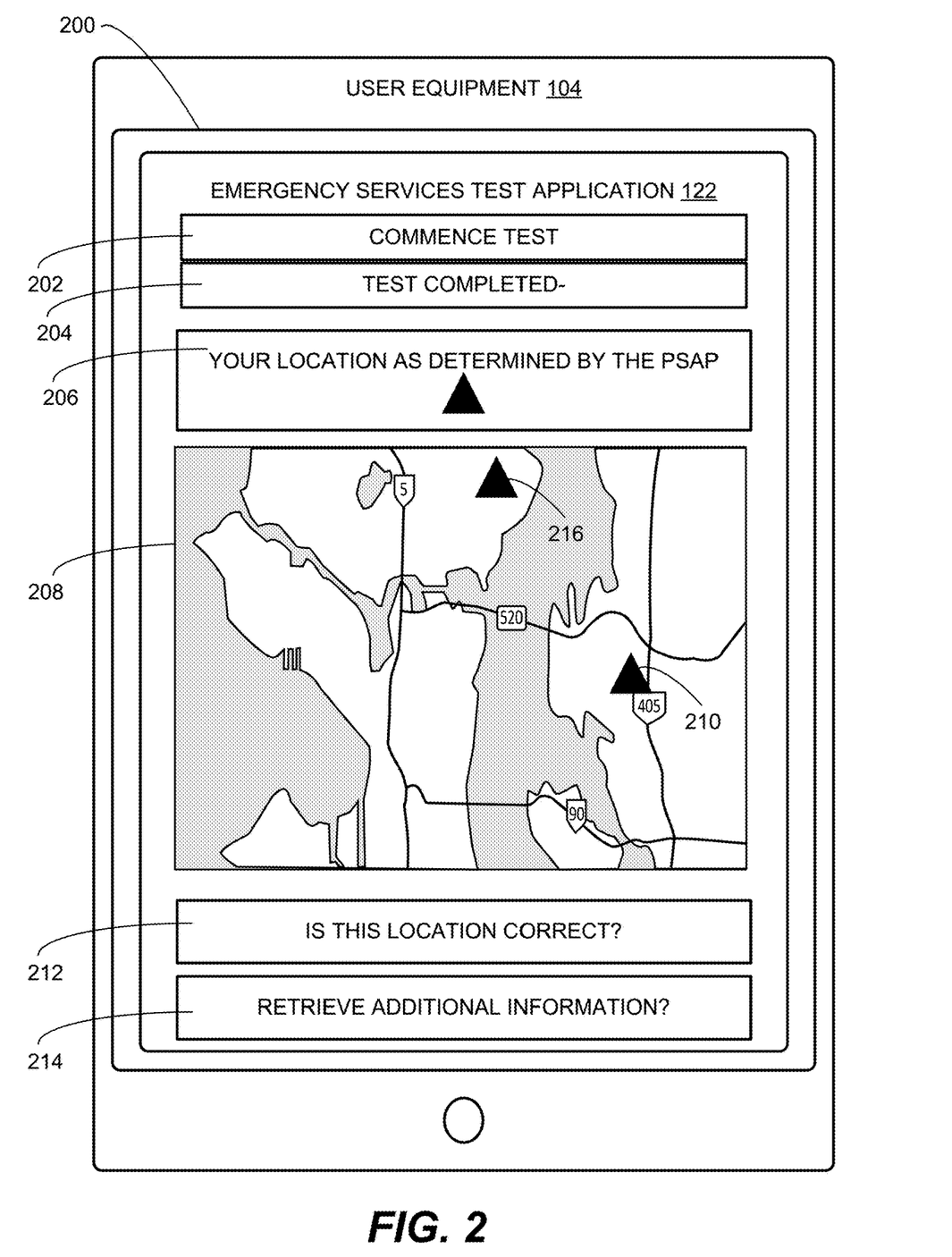
FIG. 2 is an example user interface that can be used to test text-to-911 services, in accordance with some examples of the present disclosure.

FIG. 2 is a user interface 200 of the user equipment 104 that a user (not shown) can use to test text-to-911 services. The user interface 200 has rendered therein the emergency services test application 122 in the user interface 200 when instantiated. As noted above, the emergency services test application 122 can be used to test text-to-911 services in an automated fashion; however, it should be understood that some, if not all, of the features discussed in relation to FIG. 2 may be accomplished using other interfaces or applications, such as an SMS text messaging application.

The emergency services test application 122 includes a commence test interface 202 and a test completed interface 204. The commence test interface 202 is configured to receive an input to cause the emergency services test application 122 to commence a test of the text-to-911 service of a PSAP serving the area in which the user equipment 104 is located. Once an input is detected at the commence test interface 202, the emergency services test application 122 determines the test text number to be used for a testing operation. The test text number may be stored in a memory of the user equipment 104 or may be determined by accessing a central database or other service. The presently disclosed subject matter is not limited to any particular manner in which the test text number is determined or provided to the emergency services test application 122.

The emergency services test application 122 uses the test text number to text a test message to the PSAP 108 serving the area in which the user equipment 104 is located. The test completed interface 204 can indicate whether or not the text was successful. For example, if there is no return message or any other error, the test completed interface 204 may be rendered in red or another manner indicating an unsuccessful test. In another example, if there is a successful test, the test completed interface 204 may be rendered in green or another way to indicate a successful test. In some examples, a successful test may be a response received from the PSAP 108 indicating that the text was received at the PSAP 108, properly routed to the automated test function 118, and a response from the test function 118 indicating a successful routing of the test text.

The emergency services test application 122 may also include a location interface 206. The location interface 206 may be used to display the location as received by the PSAP 108. The location interface 206 can display additional call and caller data such an address, geolocation coordinates, GPS coordinates, the originating message, and the like. Further, the location interface 206 can also be used in concert with a map 208. The map 208 can be used to render the location information received from the PSAP 108. In the example illustrated in FIG. 2, the location as determined by the PSAP 108 is illustrated using marker 210. A user can view the marker 210 and use the marker 210 as another means to verify that the location of the user equipment 104 as determined by the PSAP 108 is accurate. For example, it is not unusual for a larger city to have multiple streets with similar names. Indicating the location on the map 208 can help the user verify that, if called, the emergency services will be called to the correction location. In some examples, the emergency services test application 122 can automatically commence a test according to a schedule or other criteria such as distance traveled of the user equipment 104 without a user input.

The emergency services test application 122 can further include a verification interface 212 configured to receive an input from a user to verify that the information provided in the test is accurate. If the verification interface 212 receives an input that the location is incorrect, the emergency services test application 122, or another service, may send a communication to the PSAP 108 to instantiate the troubleshooting function 120 to commence a determination as to why incorrect information was received by the user. The PSAP 108 troubleshooting function 120 may query the emergency services test application 122, user equipment 104, or even other services such as the network 102 to determine why the information was incorrect. The troubleshooting operation may be used to verify other user equipment or the accuracy of the equipment servicing the PSAP 108.

In addition to other functions described hereinabove, the automated test function 118 may be further configured with query capabilities that, for example, allows a user to query various aspects of the PSAP 108. For example, a user may input a query into the additional information interface 214 asking the PSAP 108 how long it would take emergency services to arrive at a particular location if an emergency call was made. The automated test function 118 may use the location information and information known relating to police cars, ambulances, traffic patterns and current traffic conditions, and provide an estimated time of arrival. The additional information interface 214 can receive other types of queries, the presently disclosed subject matter not being limited to any particular type of query. In some examples, the query may be a textual, audio, or visual file that is transmitted, whereupon the PSAP 108 transmits the information back. In these examples, the test may be a type of "echo line" that tests two way audio and provides a text, audio, or visual file back to the user with similar information as the test file. For example, a user may record and text a test message. The PSAP 108 automated test function 118 may receive the audio file, translate the audio from audio to text, and then transmit the interpreted text back to the user. In another example, a user may take a picture of a piece of paper with the word "HELP" written on the paper. The automated test function 118 may receive the visual file, scan for text, and then transmit the text back to the user to verify the accuracy of the translation. In another example, a user may record and transmit an audio test file. The automated test function 118 may receive the audio file, translate the audio to text, and then respond with an audio file. The use of audio test files may be performed in a manner similar to automated answer In some examples, if information received from the user equipment 104 is incorrect, the troubleshooting function 120 of the PSAP 108 can perform an area-wide troubleshooting operation to determine if information of other devices covered by the PSAP 108 is wrong. For example, the PSAP 108 may receive location information for a second device 216. The PSAP 108 may query the second device 216, the location-based services 114 if the location of the second device 216 is known to the location-based services 114, or another entity in an attempt to determine if the location of the second device 216 is correct or incorrect. In this manner, the PSAP 108 may determine that the issue is specific to the user equipment 104 or is a larger issue.

Figure 3:
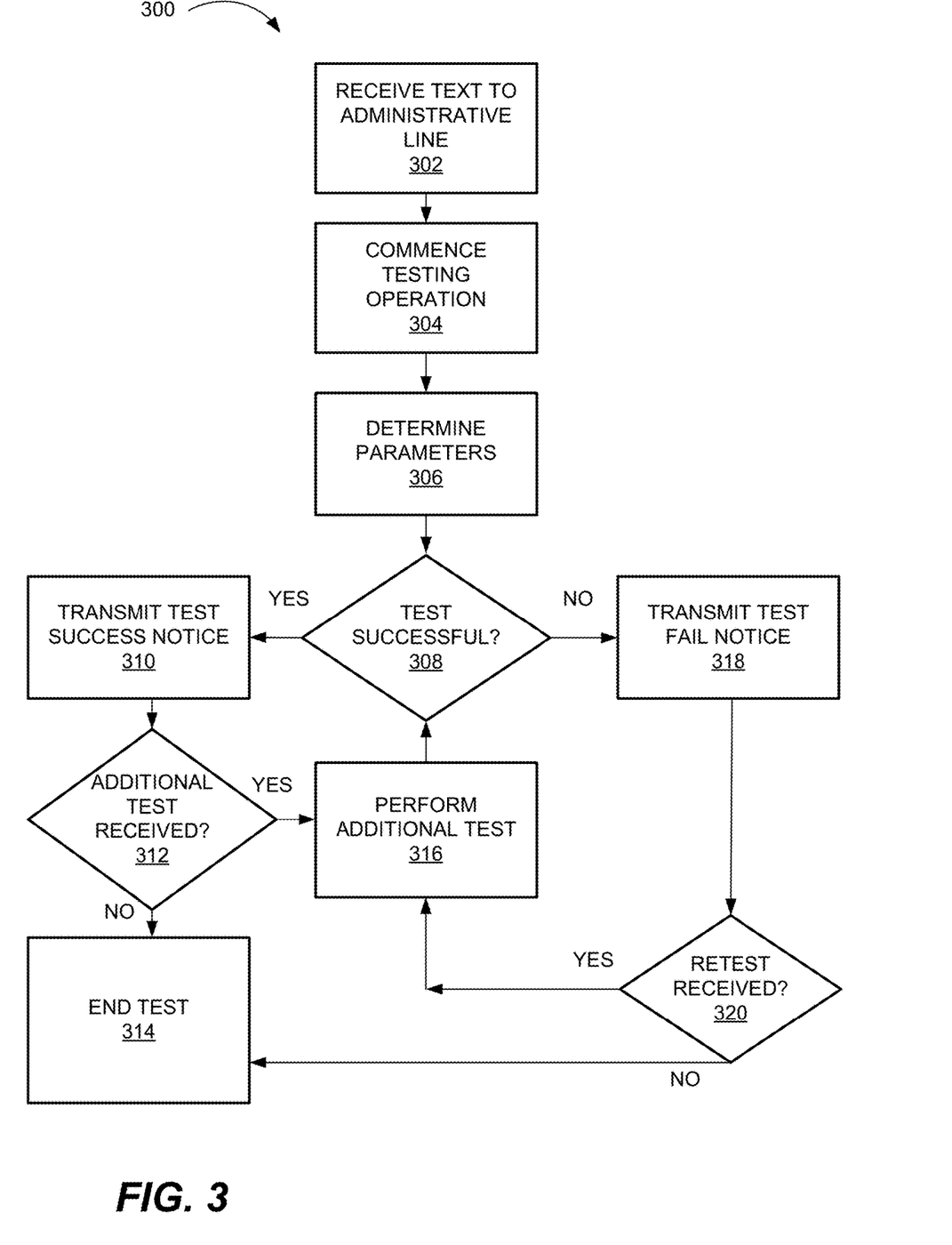
FIG. 3 is an illustrative process for testing text-to-911 services of a public safety answering point, in accordance with some examples of the present disclosure.

FIG. 3 is an illustrative process 300 for testing text-to-911 services of a public safety answering point, such as the PSAP 108 of FIG. 1. The process and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 3, the process 300 commences at operation 302, where a test text is received at the administrative line, or automated test function 118, of the PSAP 108. In some examples, the test text can be received from a cellphone or other communication device such as the user equipment 104 and/or the vehicle 106.

The process 300 continues to operation 304, where the testing operation is commenced. In some examples, the testing operation includes the receipt of the test text at the PSAP server 110 of the PSAP 108. The PSAP server 110 routes the test text to the automated test function 118.

The process 300 continues to operation 306, where parameters are determined. In some examples, the parameters can include the subscriber's name associated with the user equipment 104. In other examples, the parameters can include a location of the user equipment 104 or the vehicle 106. The presently disclosed subject matter is not limited to any particular parameter, set of parameters, or number of parameters.

The process 300 continues to operation 308, where a determination is made as to whether or not the test is successful. The determination may be based of various factors. For example, a successful test may be that the test text was received at the PSAP 108. In other examples, a successful test may be that the test text was received, and, that the parameter(s) was determined properly.

The process 300 continues to operation 310 if the test was successful, wherein a test success notice is transmitted to the user equipment 104. The success notice may be rendered in the test completed interface 204 of the emergency services test application 122.

The process 300 continues to operation 312, where a determination is made as to whether or not an additional test is received. For example, the verification interface 212 may have received an input that additional tests are requested.

The process 300 ends at operation 314 if no additional tests are received. The process 300 continues to operation 316 if an additional test is received, wherein the additional test is performed. As noted above, the additional test may be instantiated by an input received at the verification interface 212. In other examples, the additional test may be queries received at the additional information interface 214.

Returning to operation 308, if at operation 308 it is determined the test is not successful, the process 300 continues to operation 318, wherein a test fail notice is transmitted. In some examples, the fail notice may be rendered in the test completed interface 204, indicating that the test failed.

The process 300 continues to operation 320, where a determination is made as to whether or not a retest is received. The process 300 ends at operation 314 if no retest is received. The process 300 continues to operation 316 if a retest is received.

Figure 4:
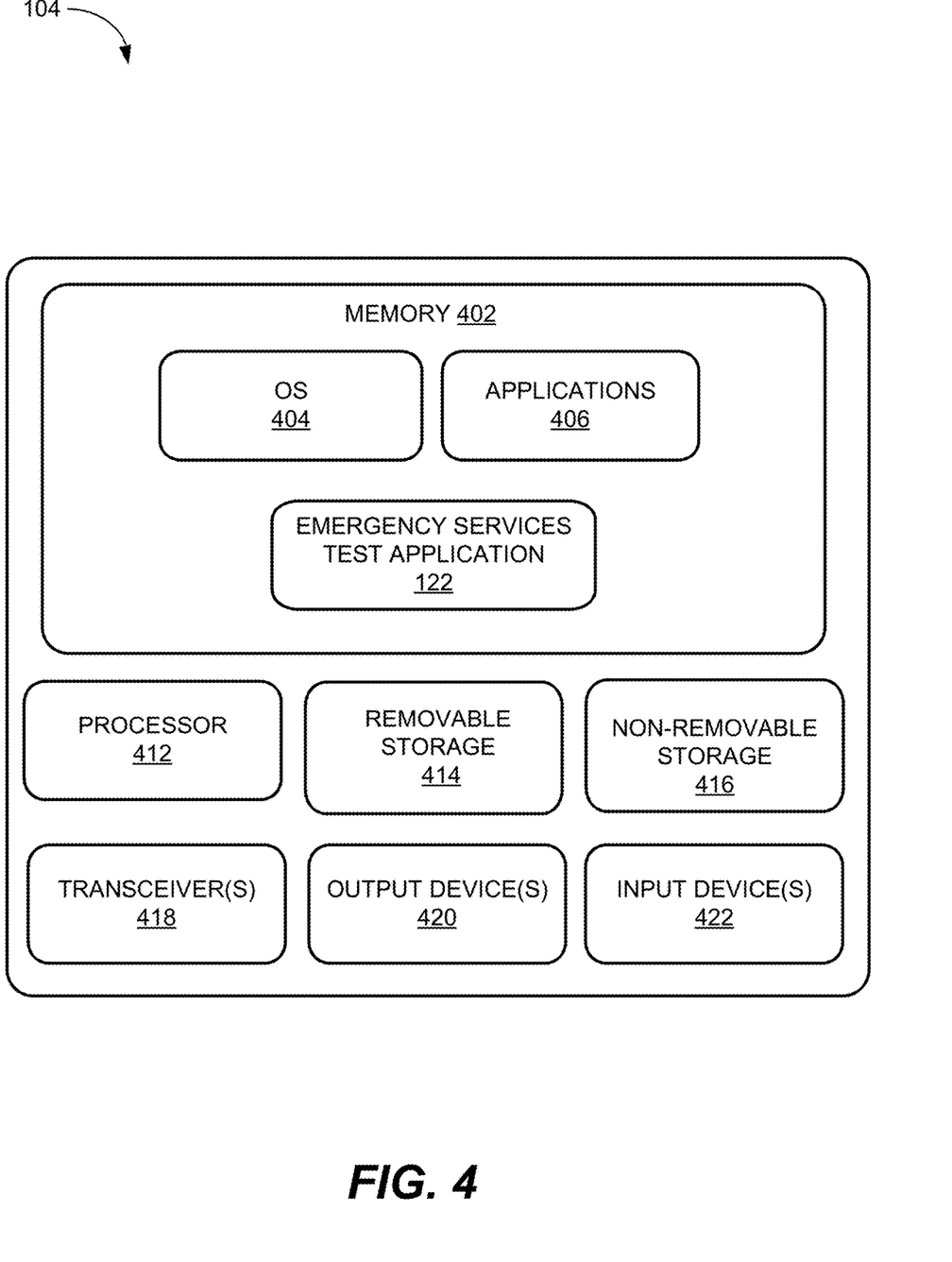
FIG. 4 depicts a component level view of a user equipment for use with the systems and methods described herein, in accordance with some examples of the present disclosure.

FIG. 4 depicts a component level view of the user equipment 104 for use with the systems and methods described herein. The user equipment 104 could be any device capable of communicating using the network 102. The user equipment 104 can comprise several components to execute the above-mentioned functions. As discussed below, the user equipment 104 can comprise memory 402 including an operating system (OS) 404 and one or more standard applications 406. The standard applications 406 can include many features common to user equipment such as, for example, applications initiated using voice commands (such as Internet searches, home appliance controls, and the like), music player, Internet radio, and other such applications. In this case, the standard applications 406 can also comprise a video call application, an audio call application, and a messaging application to enable users to engage in audio calls, video calls, and messaging, among other things. The standard applications 406 can also include contacts to enable the user to select a contact to initiate, for example, a video call, audio call, text message, etc. The user equipment 104 can also comprise the emergency services test application 122.

The user equipment 104 can also comprise one or more processors 412 and one or more of removable storage 414, non-removable storage 416, transceiver(s) 418, output device(s) 420, and input device(s) 422. In various implementations, the memory 402 can be volatile (such as random access memory (RAM)), non-volatile (such as read only memory (ROM), flash memory, etc.), or some combination of the two. The memory 402 can include all, or part, of the emergency services test application 122. The memory 402 can further include test text numbers to be used depending on the location of the user equipment 104. In some examples, rather than being stored in the memory 402, some, or all, of the emergency services test application 122 and test text numbers, and other information, can be stored on a remote server or a cloud of servers accessible by the user equipment 104.

The memory 402 can also include the OS 404. The OS 404 varies depending on the manufacturer of the user equipment 104. The OS 404 contains the modules and software that support basic functions of the user equipment 104, such as scheduling tasks, executing applications, and controlling peripherals. In some examples, the OS 404 can enable the emergency services test application 122, and provide other functions, as described above, via the transceiver(s) 418. The OS 404 can also enable the user equipment 104 to send and retrieve other data and perform other functions using the emergency services test application 122.

The user equipment 104 can also comprise one or more processors 412. In some implementations, the processor(s) 412 can be one or more central processing units (CPUs), graphics processing units (GPUs), both CPU and GPU, or any other processing unit. The user equipment 104 may also include additional data storage devices (removable and/or non-removable) such as, for example, magnetic disks, optical disks, or tape. Such additional storage is illustrated in FIG. 4 by removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the user equipment 104. Any such non-transitory computer-readable media may be part of the user equipment 104 or may be a separate database, databank, remote server, or cloud-based server.

In some implementations, the transceiver(s) 418 include any transceivers known in the art. In some examples, the transceiver(s) 418 can include wireless modem(s) to facilitate wireless connectivity with other components (e.g., between the user equipment 104 and a wireless modem that is a gateway to the Internet), the Internet, and/or an intranet. Specifically, the transceiver(s) 418 can include one or more transceivers that can enable the user equipment 104 to send and receive data, video calls, audio calls, and messages and to perform other functions. Thus, the transceiver(s) 418 can include multiple single-channel transceivers or a multi-frequency, multi-channel transceiver to enable the user equipment 104 to send and receive video calls, audio calls, messaging, etc. The transceiver(s) 418 can enable the user equipment 104 to connect to multiple networks including, but not limited to 2G, 3G, 4G, 5G, and Wi-Fi networks. The transceiver(s) can also include one or more transceivers to enable the user equipment 104 to connect to future (e.g., 6G) networks, Internet-of-Things (IoT), machine-to machine (M2M), and other current and future networks.

The transceiver(s) 418 may also include one or more radio transceivers that perform the function of transmitting and receiving radio frequency communications via an antenna (e.g., Wi-Fi or Bluetooth®). In other examples, the transceiver(s) 418 may include wired communication components, such as a wired modem or Ethernet port, for communicating via one or more wired networks. The transceiver(s) 418 can enable the user equipment 104 to make audio and video calls, download files, access web applications, and provide other communications associated with the systems and methods, described above.

In some implementations, the output device(s) 420 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 420 can also include speakers, or similar devices, to play sounds or ringtones when an audio call or video call is received. Output device(s) 420 can also include ports for one or more peripheral devices, such as headphones, peripheral speakers, or a peripheral display.

In various implementations, input device(s) 422 include any input devices known in the art. For example, the input device(s) 422 may include a camera, a microphone, or a keyboard/keypad. The input device(s) 422 can include a touch-sensitive display or a keyboard to enable users to enter data and make requests and receive responses via web applications (e.g., in a web browser), make audio and video calls, and use the standard applications 406, among other things. In some examples, the input device(s) 422 may be a communication cable connected between the user equipment 104 a device such that communications between the user equipment 104 and the device is a wired connection. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 422 and an output device 420.

Figure 5:
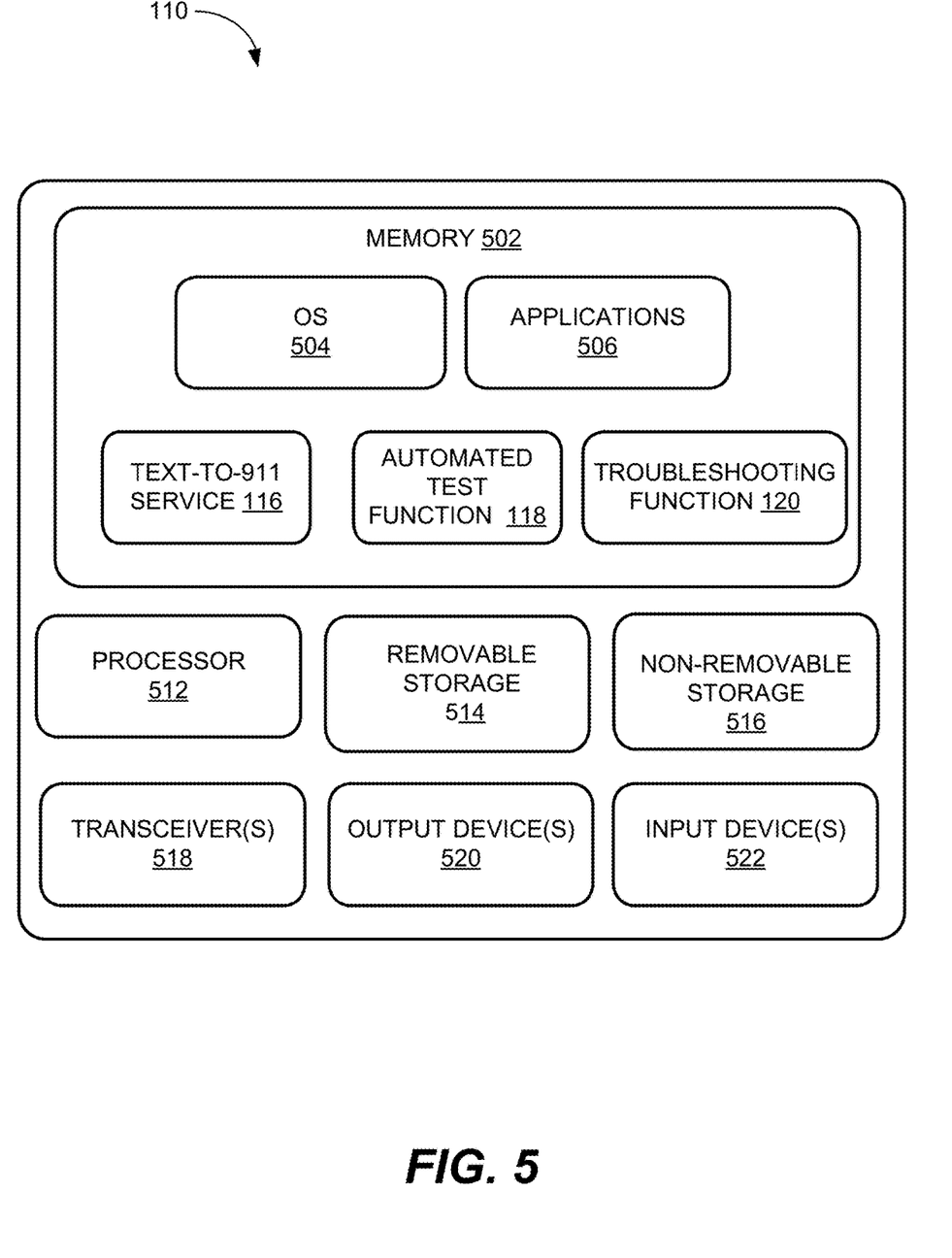
FIG. 5 depicts a component level view of a PSAP server for use with the systems and methods described herein, in accordance with some examples of the present disclosure.

FIG. 5 depicts a component level view of the PSAP server 110 for use with the systems and methods described herein. The PSAP server 110 could be any device capable of communicating using the network 102. The PSAP server 110 can comprise several components to execute the above-mentioned functions. As discussed below, the PSAP server 110 can comprise memory 502 including an operating system (OS) 504 and one or more standard applications 506. The standard applications 506 can include many features common to user equipment such as, for example, applications initiated using voice commands (such as Internet searches, home appliance controls, and the like), music player, Internet radio, and other such applications. In this case, the standard applications 506 can also comprise a video call application, an audio call application, and a messaging application to enable users to engage in audio calls, video calls, and messaging, among other things. The standard applications 506 can also include contacts to enable the user to select a contact to initiate, for example, a video call, audio call, text message, etc. The PSAP server 110 can also comprise the text-to-911 service 116, the automated test function 118, and the troubleshooting function 120.

The PSAP server 110 can also comprise one or more processors 512 and one or more of removable storage 514, non-removable storage 516, transceiver(s) 518, output device(s) 520, and input device(s) 522. In various implementations, the memory 502 can be volatile (such as random access memory (RAM)), non-volatile (such as read only memory (ROM), flash memory, etc.), or some combination of the two. The memory 502 can include all, or part, of the text-to-911 service 116, the automated test function 118, and the troubleshooting function 120. In some examples, rather than being stored in the memory 502, some, or all, of the text-to-911 service 116, the automated test function 118, and the troubleshooting function 120, and other information, can be stored on a remote server or a cloud of servers accessible by the PSAP server 110.

The memory 502 can also include the OS 504. The OS 504 varies depending on the manufacturer of the PSAP server 110. The OS 504 contains the modules and software that support basic functions of the PSAP server 110, such as scheduling tasks, executing applications, and controlling peripherals. In some examples, the OS 504 can enable the text-to-911 service 116, the automated test function 118, and provide other functions, as described above, via the transceiver(s) 518. The OS 504 can also enable the PSAP server 110 to send and retrieve other data and perform other functions using the text-to-911 service 116, the automated test function 118.

The PSAP server 110 can also comprise one or more processors 512. In some implementations, the processor(s) 512 can be one or more central processing units (CPUs), graphics processing units (GPUs), both CPU and GPU, or any other processing unit. The PSAP server 110 may also include additional data storage devices (removable and/or non-removable) such as, for example, magnetic disks, optical disks, or tape. Such additional storage is illustrated in FIG. 5 by removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. The memory 502, removable storage 514, and non-removable storage 516 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the PSAP server 110. Any such non-transitory computer-readable media may be part of the PSAP server 110 or may be a separate database, databank, remote server, or cloud-based server.

In some implementations, the transceiver(s) 518 include any transceivers known in the art. In some examples, the transceiver(s) 518 can include wireless modem(s) to facilitate wireless connectivity with other components (e.g., between the PSAP server 110 and a wireless modem that is a gateway to the Internet), the Internet, and/or an intranet. Specifically, the transceiver(s) 518 can include one or more transceivers that can enable the PSAP server 110 to send and receive data, video calls, audio calls, and messages and to perform other functions. Thus, the transceiver(s) 518 can include multiple single-channel transceivers or a multi-frequency, multi-channel transceiver to enable the PSAP server 110 to send and receive video calls, audio calls, messaging, etc. The transceiver(s) 518 can enable the PSAP server 110 to connect to multiple networks including, but not limited to 2G, 3G, 4G, 5G, and Wi-Fi networks. The transceiver(s) can also include one or more transceivers to enable the PSAP server 110 to connect to future (e.g., 6G) networks, Internet-of-Things (IoT), machine-to machine (M2M), and other current and future networks.

The transceiver(s) 518 may also include one or more radio transceivers that perform the function of transmitting and receiving radio frequency communications via an antenna (e.g., Wi-Fi or Bluetooth®). In other examples, the transceiver(s) 518 may include wired communication components, such as a wired modem or Ethernet port, for communicating via one or more wired networks. The transceiver(s) 418 can enable the PSAP server 110 to make audio and video calls, download files, access web applications, and provide other communications associated with the systems and methods, described above.

In some implementations, the output device(s) 520 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 520 can also include speakers, or similar devices, to play sounds or ringtones when an audio call or video call is received. Output device(s) 520 can also include ports for one or more peripheral devices, such as headphones, peripheral speakers, or a peripheral display.

In various implementations, input device(s) 522 include any input devices known in the art. For example, the input device(s) 522 may include a camera, a microphone, or a keyboard/keypad. The input device(s) 522 can include a touch-sensitive display or a keyboard to enable users to enter data and make requests and receive responses via web applications (e.g., in a web browser), make audio and video calls, and use the standard applications 506, among other things. In some examples, the input device(s) 522 may be a communication cable connected between the PSAP server 110 and a device such that communications between the PSAP server 110 and the device is a wired connection. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 522 and an output device 520

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method of testing a public safety answering point (PSAP), the method comprising:
   receiving from a device, at a network, a text-to-911 message directed to a test number of a PSAP of an emergency call center;
   determining that the text-to-911 message is directed to the test number of the PSAP;
   routing the text-to-911 message to an administrative line of the PSAP, wherein the administrative line connects to an emergency automated test response function at the emergency call center rather than a live 9-1-1 telecommunicator;
   receiving an acknowledgement from the emergency automated test response function, wherein the acknowledgement includes a determined location of the device;
   providing the acknowledgement to the device;
   receiving a correction message providing a user determined location of the device to correct the determined location of the device; and
   initiating a device-specific troubleshooting operation to determine a cause of a discrepancy between the user determined location and the determined location.

2. The method of claim 1, wherein the acknowledgement further includes instructions on how to further test the PSAP using the test number.

3. The method of claim 1, wherein the acknowledgement includes an indication of a successful connection to the emergency automated test response function.

4. The method of claim 1, further comprising initiating an area-wide troubleshooting operation to determine if locations of one or more second devices are incorrect.

5. The method of claim 1, wherein the acknowledgement includes a connection option to allow the device to connect to the emergency automated test response function using a voice connection to provide for receipt of additional queries to the PSAP.

6. A system comprising:
   a memory storing computer-executable instructions; and
   a processor in communication with the memory, the computer-executable instructions causing the processor to perform acts comprising:
   receiving from a device, at a network, a text-to-911 message directed to a test number of a PSAP of an emergency call center;
   determining that the text-to-911 message is directed to the test number of the PSAP;
   routing the text-to-911 message to an administrative line of the PSAP, wherein the administrative line connects to an emergency automated test response function at the emergency call center rather than a live 9-1-1 telecommunicator;
   receiving an acknowledgement from the emergency automated test response function, wherein the acknowledgement includes a determined location of the device;
   providing the acknowledgement to the device;
   receiving a correction message providing a user determined location of the device to correct the determined location of the device; and
   initiating a device-specific troubleshooting operation to determine a cause of a discrepancy between the user determined location and the determined location.

7. The system of claim 6, wherein the acknowledgement further includes instructions on how to further test the PSAP using the test number.

8. The system of claim 6, wherein the acknowledgement includes an indication of a successful connection to the emergency automated test response function.

9. The system of claim 6, further comprising computer-executable instructions for initiating an area-wide troubleshooting operation to determine if locations of one or more second devices are incorrect.

10. The system of claim 6, wherein the acknowledgement includes a connection option to allow the device to connect to the emergency automated test response function using a voice connection to provide for receipt of additional queries to the PSAP.

11. A non-transitory computer-readable storage medium having computer-executable instructions stored thereupon that, when executed by a computer, cause the computer to perform acts comprising:

receiving from a device, at a network, a text-to-911 message directed to a test number of a PSAP of an emergency call center;

determining that the text-to-911 message is directed to the test number of the PSAP;

routing the text-to-911 message to an administrative line of the PSAP, wherein the administrative line connects to an emergency automated test response function at the emergency call center rather than a live 9-1-1 telecommunicator;

receiving an acknowledgement from the emergency automated test response function, wherein the acknowledgement includes a determined location of the device;

providing the acknowledgement to the device;

receiving a correction message providing a user determined location of the device to correct the determined location of the device; and initiating a device-specific troubleshooting operation to determine a cause of a discrepancy between the user determined location and the determined location.

12. The non-transitory computer-readable storage medium of claim 11, wherein the acknowledgement further includes instructions on how to further test the PSAP using the test number.

13. The non-transitory computer-readable storage medium of claim 11, wherein the acknowledgement includes an indication of a successful connection to the emergency automated test response function.

14. The non-transitory computer-readable storage medium of claim 11, the computer-executable instructions further causing the computer to perform acts comprising:

initiating an area-wide troubleshooting operation to determine if locations of one or more second devices are incorrect.

\* \* \* \* \*